United States Patent [19]
Warburton

[11] Patent Number: 5,522,146
[45] Date of Patent: Jun. 4, 1996

[54] LEVEL MARKER

[76] Inventor: Edwin E. Warburton, 8510 Beaufort Dr., Fulton, Md. 20759

[21] Appl. No.: 313,010

[22] Filed: Sep. 27, 1994

[51] Int. Cl.⁶ ........................................... G01C 9/18
[52] U.S. Cl. .................. 33/347; 33/354; 33/371; 33/372
[58] Field of Search ............... 33/333, 334, 347, 33/354, 370, 371, 372, 373, 365, 376, 379; 401/52, 194, 195

[56] References Cited

U.S. PATENT DOCUMENTS

| D. 330,910 | 11/1992 | Warburton . | |
|---|---|---|---|
| 667,968 | 2/1901 | Call | 401/52 |
| 1,339,707 | 5/1920 | Lazarides | 401/52 |
| 1,354,195 | 9/1920 | Jokubaitus | 33/354 |
| 1,595,900 | 8/1926 | Maas | 401/52 |
| 2,251,640 | 8/1941 | Skrainka | 33/372 |
| 3,186,099 | 6/1965 | Florko, Jr. | 33/347 |
| 4,124,940 | 11/1978 | Vaida | 33/379 |
| 4,292,741 | 10/1981 | Scandella | 33/379 |

FOREIGN PATENT DOCUMENTS

| 376395 | 5/1964 | Switzerland | 33/333 |
|---|---|---|---|
| 20468 | of 1892 | United Kingdom | 33/370 |
| 1192535 | 5/1970 | United Kingdom | 33/371 |

Primary Examiner—Thomas B. Will
Attorney, Agent, or Firm—Chase & Yakimo

[57] ABSTRACT

A holder for releasably engaging a level and pencil therein. The holder generally comprises a housing having first and second open ends configured to releasably fit about a carpenter's pencil. A window is centrally positioned in a wall of the housing and between two longitudinally spaced-apart walls positioned within the housing which form a chamber therebetween. A port in each wall allows for extension of a bubble level between the end walls through the chamber and adjacent the window.

9 Claims, 7 Drawing Sheets

LEVEL MARKER

BACKGROUND OF THE INVENTION

This invention relates to carpenters' tools and, more particularly, to a tool which jointly presents a bubble level and pencil for functional use.

During various carpentry projects ranging from house building to woodworking, it may be necessary to utilize a bubble level to level various surfaces. During such alignment it may also be necessary to mark the structure with various indicia providing relevant information to the carpenter. For example, indicia may be marked on doors and/or windows indicating that the appropriate surfaces have been leveled so that the windows may then be more securely fastened to the frame by another worker.

Heretofore one problem which has arisen during house construction is that the level and the marking indicia, such as a carpenter's pencil, invariably become separated. Accordingly, valuable time is wasted by the carpenter in searching for the level or the pencil.

In response thereto I have provided a housing for releasably mounting a bubble level and carpenter's pencils therein so as to make them readily and simultaneously available to the user. The main housing presents structure and configuration which provides for a releasable fit of the bubble level and carpenter's pencils therein.

It is therefore a general object of the invention to provide a tool presenting a bubble level and marking indicia.

Another object of this invention is to provide a device, as aforesaid, which releasably engages a bubble level therein.

Still another object of this invention is to provide a device, as aforesaid, which releasably engages first and/or second carpenter's pencils therein.

A further object of this invention is to provide a device, as aforesaid, which allows for alternative types of bubble levels to be releasably engaged therein.

A more particular object of the invention is to provide a device, as aforesaid, which protects the bubble level from damage.

Other objects and advantages of this invention will become apparent from the following description taken in connection with the accompanying drawings, wherein is set forth by way of illustration and example, a now preferred embodiment of this invention.

DESCRIPTION OF THE PREFERRED EMBODIMENT

Figure 1:
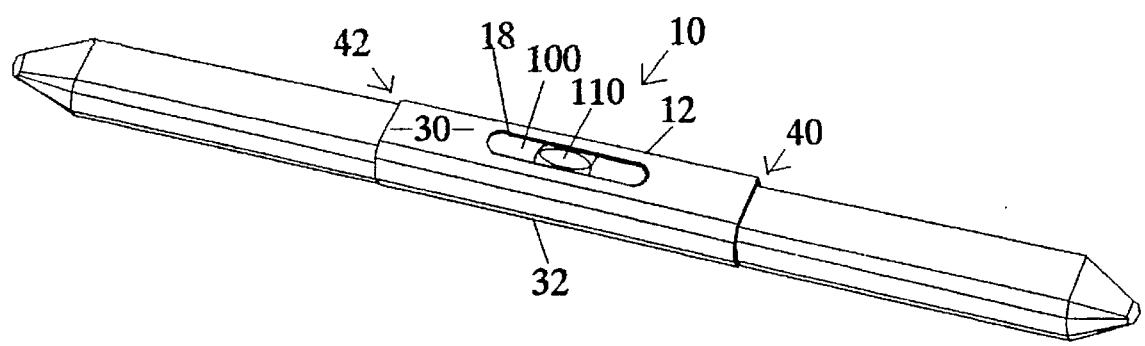
FIG. 1 is a perspective view of the level marker with a horizontal bubble level and pencils in place.
Figure 2:
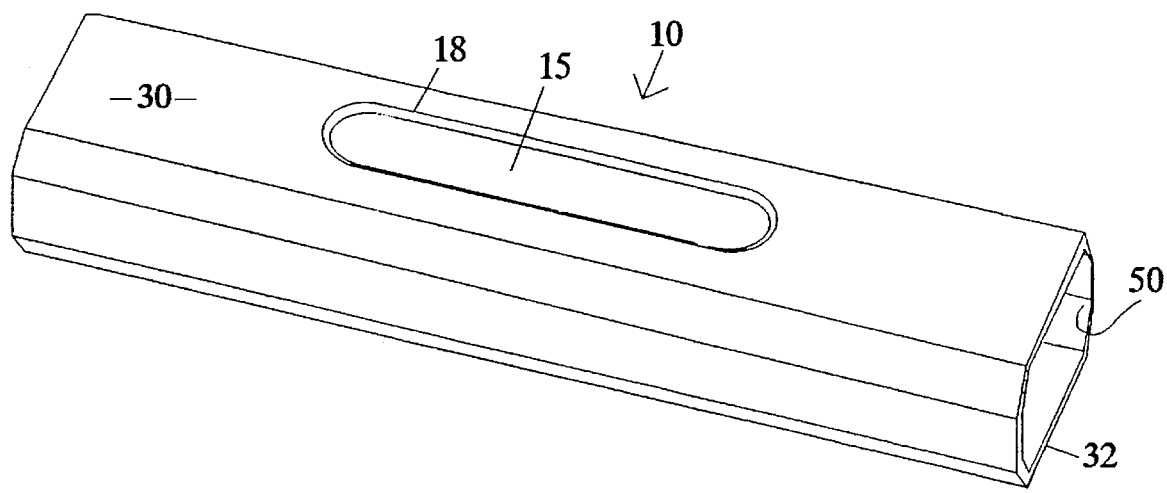
FIG. 2 is a perspective view of the level marker of FIG. 1, on an enlarged scale, with the bubble level and pencils removed.
Figure 3:
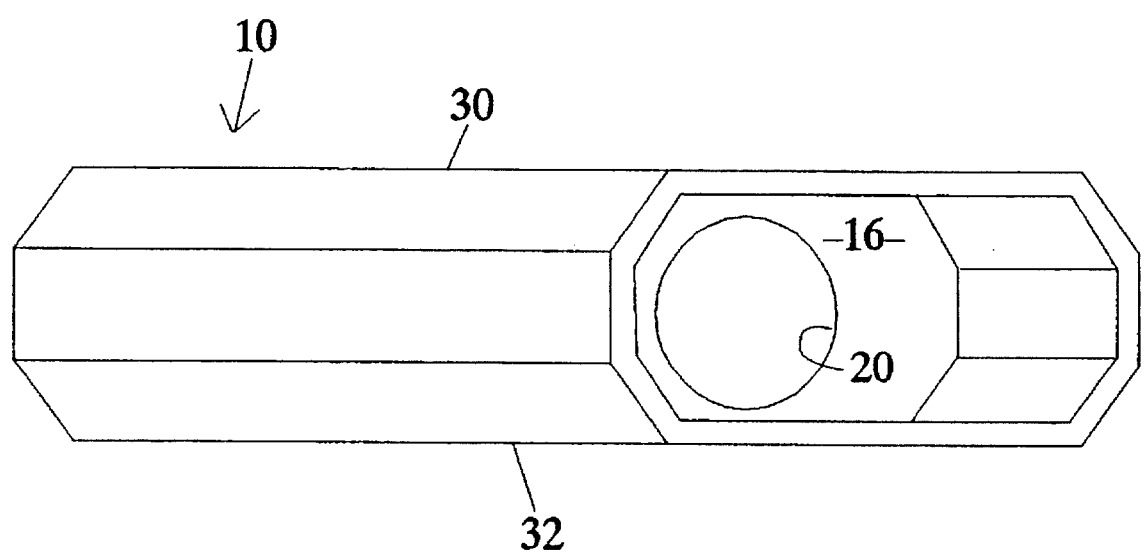
FIG. 3 is a perspective view of the level marker and illustrating one end thereof with the bubble level and pencils removed.
Figure 4:
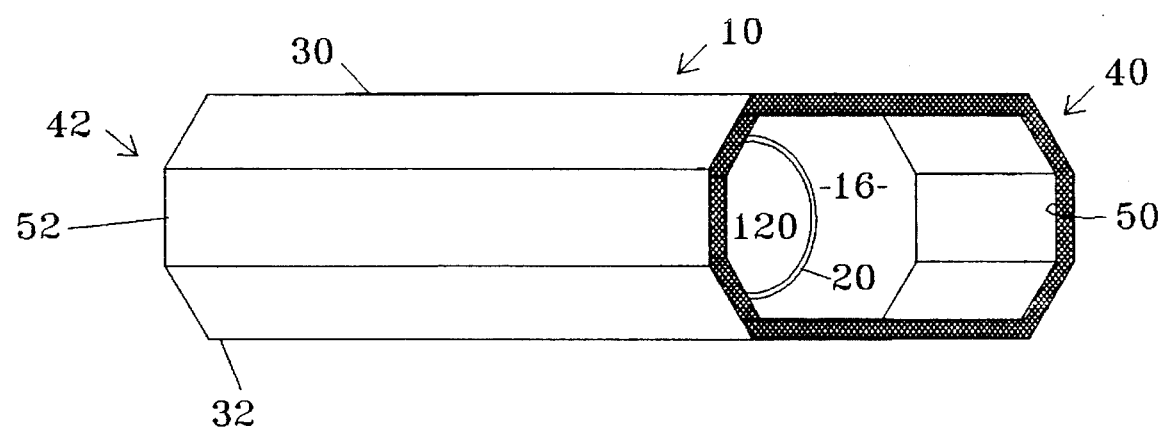
FIG. 4 is a perspective view of the level marker and illustrating one end thereof with the bubble level in place.
Figure 5:
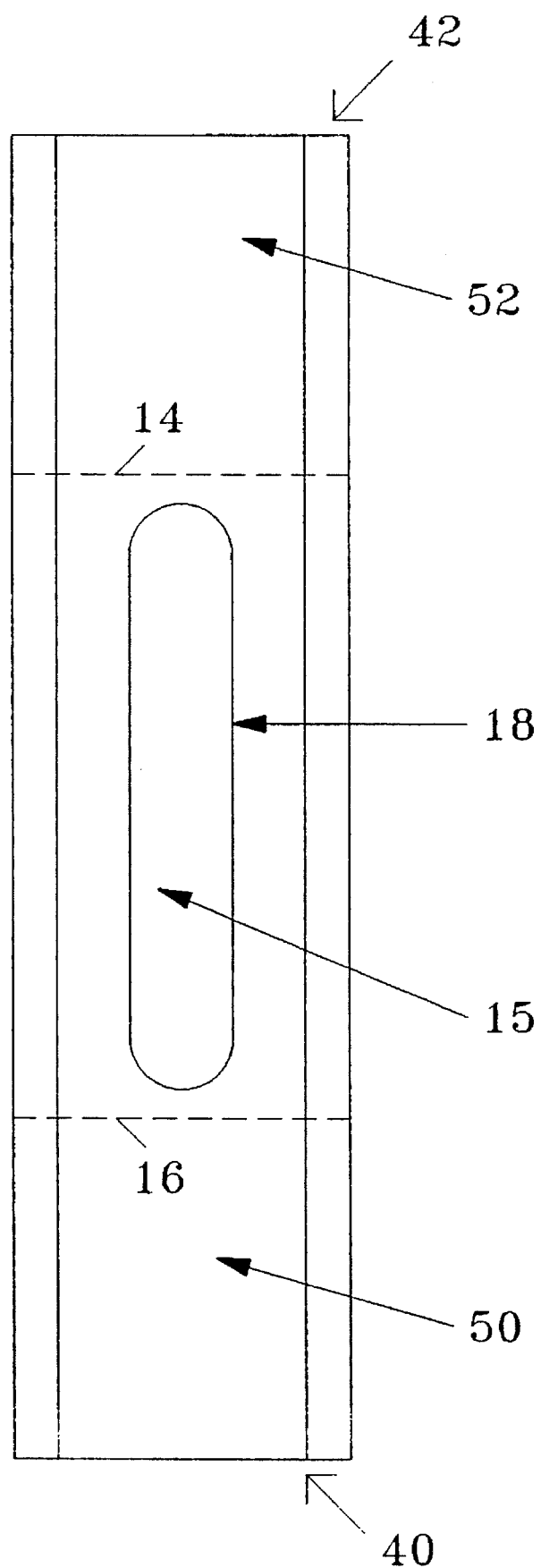
FIG. 5 is a top view of the level marker.
Figure 6:
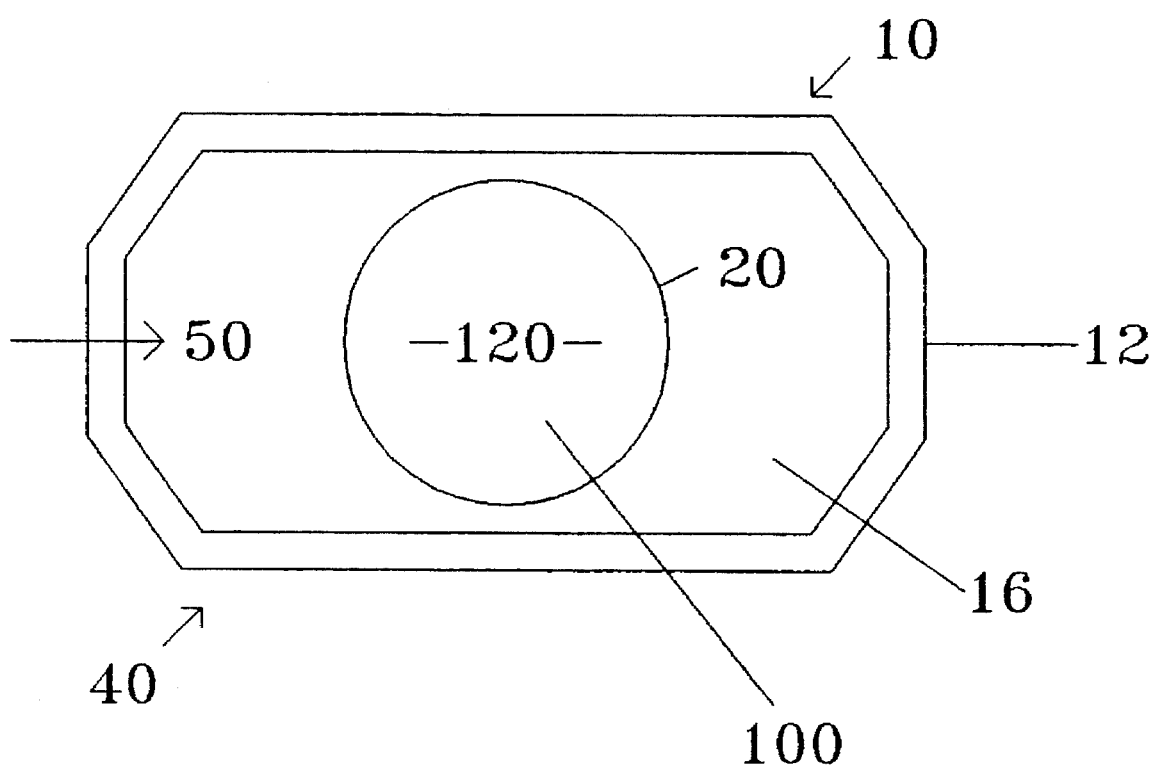
FIG. 6 is an end view of the level marker of FIG. 1.

Turning more particularly to the drawings, FIGS. 1–6 illustrate a perspective view of the level marker 10 as comprising a main housing 12 having a generally octagonal/eight-sided configuration. (Upper 30 and lower 32 housing surfaces have an enlarged rectangular configuration relative to the other surfaces.) Centrally positioned within the main housing 12 is a central chamber 15 as defined by two longitudinally spaced-apart interior end walls 14, 16 positioned within the housing 12. Within each end wall 14, 16 is a circular port 20 aligned one with the other. An oval aperture 18 in the housing 12 surface 30 presents a window 18 to the central chamber 15. A window may also be positioned on the opposed lower surface 32.

The ports 20 allow for insertion of a bubble level 100 therethrough. The level 100 extends between the sidewalls 14, 16. Upon level 100 extension the bubble 110 is presented at the window 18. The window 18 is elongated to display any slope indicia which may appear along the length of the bubble level 100.

Figure 7:
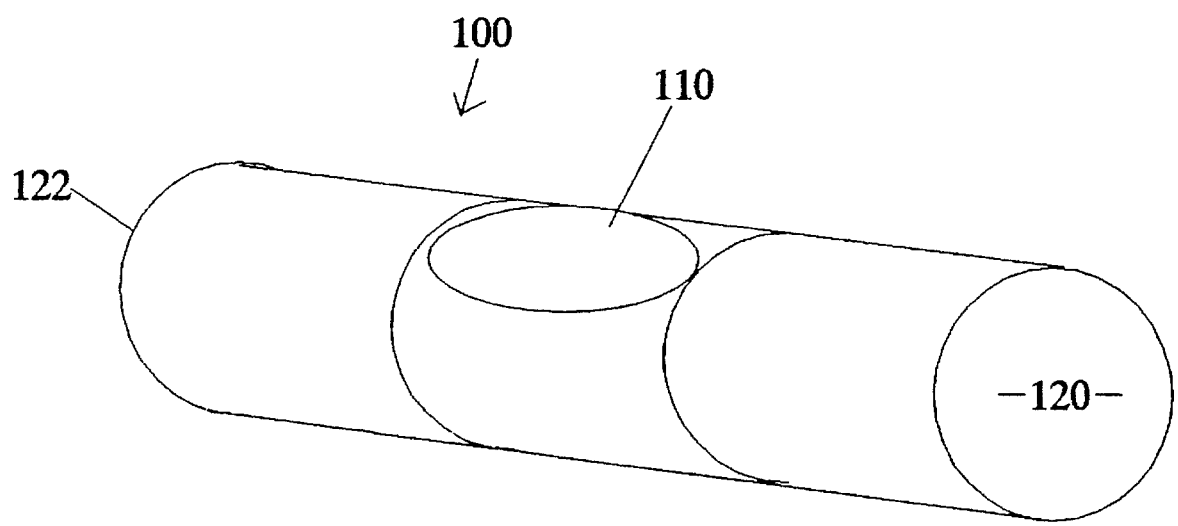
FIG. 7 is a perspective view of a bubble level on an enlarged scale.

As shown in FIG. 7 the level 100 is circular in configuration. Accordingly, the respective end wall ports 20 present a circular configuration complementary to the circular ends 120, 122 of the bubble level 100. This relationship allows for a releasable friction fit between the end walls 14, 16 ports 20 and the level ends 120, 122. Upon such fit the level is supported in its extension through the chamber 15 by the respective end walls 14, 16. It is understood that various levels may be utilized. For example, if a level is needed to plumb a vertical surface, level 100 may be removed and easily replaced with a suitable plumb level.

Accordingly, it is understood that the configuration of the end wall ports 20 need not always be circular but may be configured to complement the configuration of the ends of the level so as to present a friction fit/support functionality.

Located at each open end 40, 42 of the main housing 12 are pencil housings 50, 52. The configuration of such housings 50, 52 complements that of the carpenter's pencil to be releasably engaged therein. As such the configuration of housing 12 cooperates with the end walls 14, 16 to present a housing which allows for a releasable friction fit of a carpenter's pencil therein. The length of level 100 is chosen so as to not protrude beyond the end walls 14, 16 when supported in chamber 15. Thus, insertion of the carpenter's pencil into a respective pencil housing 50, 52 will not interfere with the bubble level 100.

It is to be understood that while a certain form of this invention has been illustrated and described, it is not limited thereto except insofar as such limitations are included in the following claims and allowable functional equivalents thereof.

Having thus described the invention, what is claimed as new and desired to be secured by Letters Patent is as follows:

1. A device for holding a level and pencil in operative positions comprising:

a main housing having first and second ends;

a window in said housing for viewing therein;

means within said housing for supporting the level in said housing at a position adjacent said window, said support means comprising:

a first wall in said housing;

a second wall in said housing longitudinally displaced from said first wall with said window positioned therebetween;

a port in each of said walls, said ports allowing for insertion of the level through said respective walls, said walls supporting the level adjacent said window;

at least said first end of said housing presenting an open end configured for providing a friction fit of the pencil therein.

2. The device as claimed in claim 1 wherein said walls are longitudinally displaced at a distance to preclude extension of ends of the supported level beyond the walls.

3. The device as claimed in claim 1 wherein each port is of a configuration for a friction fit of a respective end of the level therein.

4. The device as claimed in claim 3 wherein each port is circular in configuration.

5. The device as claimed in claim 1 wherein said housing open end presents a configuration for a friction fit of a carpenter's pencil therein.

6. A device for presenting a level and pencil in operative positions comprising:

a housing having first and second ends;

a window in said housing;

means within said housing for releasably engaging the level at a position adjacent said window, said engaging means comprising:

a first wall in said housing;

a second wall in said housing longitudinally displaced from said first wall to form a chamber in communication with said window;

an opening in each of said walls, said openings configured to fit about first and second ends of the level, said first and second walls supporting the level in said chamber and adjacent said window;

an open end at least at said first end of said housing for providing a releasable fit of the pencil therein.

7. The device as claimed in claim 6 wherein said walls are longitudinally displaced at a distance to preclude extension of the ends of the supported level beyond said walls.

8. The device as claimed in claim 6 wherein each wall opening is of a configuration for a friction fit of a respective one of said ends of the level therein.

9. The device as claimed in claim 6 wherein said housing open end is configured to fit about a carpenter's pencil.

* * * * *